US010425245B2

(12) United States Patent
Hund et al.

(10) Patent No.: US 10,425,245 B2
(45) Date of Patent: Sep. 24, 2019

(54) METHOD FOR SETTING UP A LOCAL CONTROL CHANNEL BETWEEN A CONTROL UNIT AND A BUILDING-INTERNAL ACCESS PORTAL

(71) Applicant: Deutsche Telekom AG, Bonn (DE)

(72) Inventors: Martin Hund, Rettert (DE); Thomas Unterschuetz, Weiterstadt (DE); Thorsten Sinning, Aachen (DE); Jochen Hiller, Neu-Ulm (DE)

(73) Assignee: DEUTSCHE TELEKOM AG, Bonn (DE)

( * ) Notice: Subject to any disclaimer, the term of this patent is extended or adjusted under 35 U.S.C. 154(b) by 316 days.

(21) Appl. No.: 14/935,463

(22) Filed: Nov. 9, 2015

(65) Prior Publication Data
US 2016/0134432 A1 May 12, 2016

(30) Foreign Application Priority Data
Nov. 11, 2014 (DE) .................. 10 2014 113 885

(51) Int. Cl.
*H04L 12/28* (2006.01)
*H04L 29/06* (2006.01)
(Continued)

(52) U.S. Cl.
CPC .......... *H04L 12/2816* (2013.01); *G05B 15/02* (2013.01); *H04L 63/0281* (2013.01);
(Continued)

(58) Field of Classification Search
CPC ........ H04L 63/02–0876; H04L 63/102; H04L 29/063333; H04L 29/12009–12367;
(Continued)

(56) References Cited

U.S. PATENT DOCUMENTS

| 8,761,101 | B1* | 6/2014 | Crosbie ............... H04W 4/005 370/230 |
| 9,112,728 | B2* | 8/2015 | Klein .................. H04L 12/5692 |
| 9,407,466 | B2* | 8/2016 | Ansley ................ H04L 12/66 |
| 2005/0169288 | A1* | 8/2005 | Kamiwada ........ H04L 29/12009 370/401 |

(Continued)

FOREIGN PATENT DOCUMENTS

| EP | 2634970 A2 | 9/2013 |
| GB | 2466107 A * | 6/2010 ............. G01D 4/004 |

*Primary Examiner* — Wing F Chan
*Assistant Examiner* — Rajeshwari Krishnan
(74) *Attorney, Agent, or Firm* — Leydig, Voit & Mayer, Ltd.

(57) ABSTRACT

A method sets up a local control channel between a control unit for controlling a building-internal electrical component, connected to a building-internal access portal, and the access portal, by authenticating the control unit against a building-external authentication server via a building-external communication network; transmitting a network address of the building-internal access portal using the building-external authentication server to the control unit upon successful authentication of the control unit against the building-external authentication server via the building-external communication network; transmitting an access authorization for the building-internal access portal to the control unit using the building-external authentication server via the building-external communication network upon successful authentication of the control unit against the building-external authentication server via the building-external communication network; and setting up the local control channel between the control unit and the building-internal access portal in response to receiving the network address of the building-internal access portal and the access authorization.

16 Claims, 8 Drawing Sheets

(51) Int. Cl.
*H04L 29/08* (2006.01)
*G05B 15/02* (2006.01)

(52) U.S. Cl.
CPC ............ *H04L 63/08* (2013.01); *H04L 63/102* (2013.01); *H04L 67/12* (2013.01); *Y04S 40/18* (2018.05)

(58) Field of Classification Search
CPC ............ H04L 61/2503; H04L 41/0896; H04L 67/1002–1025; H04L 63/1441–1483; H04L 12/2803–2834; H04L 12/5692; H04L 12/66; H04L 12/2816; H04L 12/2818; H04L 63/00–08; H04W 4/005; H04W 6/021; H04W 76/023; H04W 8/20–205
See application file for complete search history.

(56) References Cited

U.S. PATENT DOCUMENTS

| | | |
|---|---|---|
| 2010/0099382 A1 | 4/2010 | Ishiguro et al. |
| 2010/0125894 A1* | 5/2010 | Yasrebi ............... H04L 12/2818 726/4 |
| 2011/0137436 A1* | 6/2011 | Chang ................. H04L 12/2834 700/90 |
| 2012/0109384 A1 | 5/2012 | Stepanian |
| 2015/0032898 A1* | 1/2015 | Tan ..................... H04L 61/1535 709/227 |
| 2015/0256511 A1* | 9/2015 | Gupta .................... H04W 8/20 455/418 |
| 2016/0044719 A1* | 2/2016 | Sidhu ................. H04W 76/021 370/329 |
| 2016/0294770 A1* | 10/2016 | Dickinson ........... H04L 61/2503 |
| 2016/0337351 A1* | 11/2016 | Spencer ............. H04L 63/0876 |

* cited by examiner

METHOD FOR SETTING UP A LOCAL CONTROL CHANNEL BETWEEN A CONTROL UNIT AND A BUILDING-INTERNAL ACCESS PORTAL

CROSS-REFERENCE TO RELATED APPLICATIONS

Priority is claimed to German Patent Application No. DE 10 2014 113 885.6, filed on Nov. 11, 2014, the entire disclosure of which is hereby incorporated by reference herein.

FIELD

The present invention relates to a method for setting up a local control channel between a control unit for controlling at least one building-internal electrical component.

BACKGROUND

Current systems for home automation are often based on the concept of the "home-control gateway", in which applications for home automation are operated by a customer at home, for example on a home-control gateway. In said systems, the applications communicate locally with the actuators and sensors. Control units such as tablet PCs or smartphones control applications of the home automation technology.

Control units control the applications in a geographically local manner, that is to say at the time of the control, they are located together with the home-control gateway at the same location, i.e. effectively "at home". However, the control units can also control applications remotely from any desired other locations via the internet. That is to say, at the time of the control, they are located outside the "home".

FIG. 1 is a schematic view of the topology 100 of a home automation network with communication between the home-control gateway 112 and the control unit 118 via a central service 114. In this drawing, two control units 118a, 118b are shown, wherein the one 118a is located inside the "home" 110, and the second 118b is located outside the "home", that is to say in the "not home" 120. The drawing could also show a single control unit 118a, 118b which migrates between "home" 110 and "not home" 120.

The communication of the control unit 118a "home" is conducted via the central service 114. FIG. 1 shows the communication connection with the communication connections "1", that is to say the first communication connection 101, which runs from the control unit 118a via the home network 111 to the internet access device 116, and "4", that is to say the fourth communication connection 104, which runs from the IAD 116 via the internet 113 to the central service 114. The combination of two sub-connections 101, 104 results in a relatively long latency. The authenticity of the access is ascertained by the central service 114.

In the case of an interruption of the connection between the home network 111 and the central service 114, the authentication by the central service 114 results in an unsatisfactory user experience. The user then cannot access the home-control gateway 112 either locally or via the central service 114, i.e. either via the first communication connection "1" 101 or via the fourth communication connection "4".

SUMMARY

An aspect of the invention provides a method for setting up a local control channel between a control unit for controlling at least one building-internal electrical component connected to a building-internal access portal and the building-internal access portal, the method comprising: authenticating the control unit against a building-external authentication server via a building-external communication network; transmitting a network address of the building-internal access portal using the building-external authentication server to the control unit based on a successful authentication of the control unit against the building-external authentication server via the building-external communication network; transmitting an access authorization for access to the building-internal access portal to the control unit using the building-external authentication server via the building-external communication network based on the successful authentication of the control unit against the building-external authentication server via the building-external communication network; and setting up the local control channel between the control unit and the building-internal access portal in response to receiving the network address of the building-internal access portal and the access authorization.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

An aspect of the invention provides a method for setting up a local control channel between a control unit for controlling at least one building-internal electrical component, which is connected to a building-internal access portal, and the building-internal access portal. An aspect of the invention provides an access portal for at least one building-internal electrical component, to an access system for a building-internal communication network and to a method for authenticating a control unit for controlling at least one building-internal electrical component. An aspect of the invention relates to the field of home automation, in particular to gateways and routers for implementing the control of sensors and actuators in the home automation environment.

An aspect of the present invention provides a concept for a disturbance-tolerant and quick-reacting control of a home-control gateway via a control unit.

At this point, it should be emphasized that the term "building automation" and thus recording and transferring data within a building or building complex includes not only controlling functions within a building, but rather extends broadly to controlling any desired functionalities and to reading any sensors within a building or building complex. This also includes for example operating alarm systems and reading biological parameters of people located in the building, in particular in the context of healthcare. In particular, building automation also includes monitoring, open and closed-loop control and optimization means, in which all sensors, actuators, operating elements, loads and other technical units are networked.

The method and systems presented in the following can be used to set up a local control channel between a control unit, for example a control unit 118a as described above in FIG. 1, for controlling a building-internal electrical component, which is connected to a building-internal access portal, and the building-internal access portal.

Figure 3:
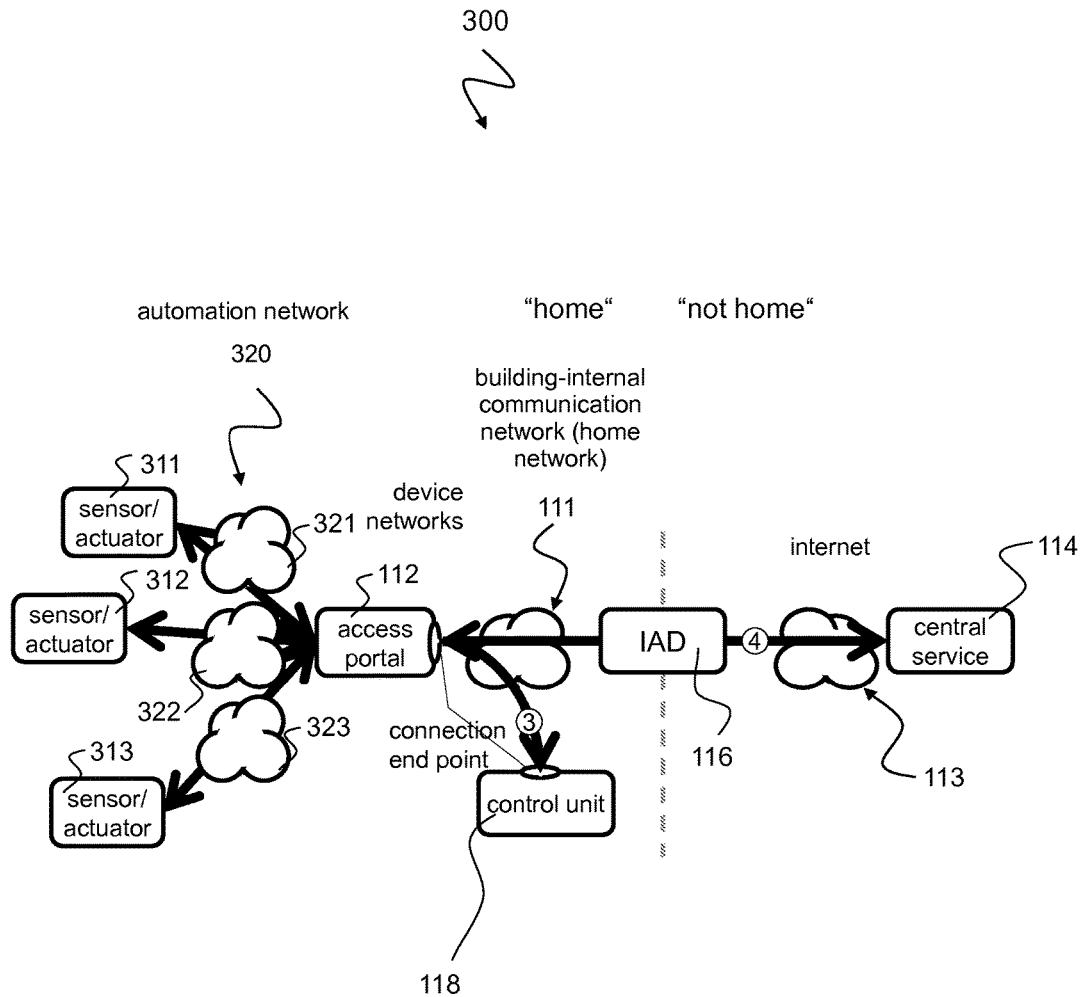
FIG. 3 is a schematic view of the topology of an access system 300 in which the access portal grants access to the individual sensors/actuators via an automation network 320, according to one embodiment.

A building-internal access portal refers to an access portal for a building-internal automation network, for example the home-control gateway described above in FIG. 1, which grants access to one or more sensors and/or actuators via an automation network comprising one or more device networks, as shown in FIG. 3. A building-internal communication or automation network in this case refers to any network which is concentrated on a geographically limited, i.e. geographically local region and conventionally refers to the networking of a house, a building or building complex or a business. It does not necessarily have to be a single building, it can also refer to a collection of buildings which are combined for example under the umbrella of one company or group of companies. It also does not necessarily have to be a building in the strict sense of the word; open-air spaces and other localities which are provided with an available communication network, for example open-air theatre performances, public viewings, etc. should also fall under the term "building" in this application.

The building-internal communication network can be a wired network, for example using Ethernet, USB, cable, etc. The building-internal communication network can be a wireless network, for example using WLAN, WiFi, Bluetooth, infrared or other short-range communication standards. As protocols for the transfer of data via the building-internal communication network, for example IPv4 or IPv6 can be used.

The building-internal automation network can be a wired network, for example using Ethernet, PowerLAN, etc. The building-internal automation network can be a wireless network, for example using ZigBee or other proprietary or standardised short-range communication standards.

The above-mentioned technologies (Ethernet, USB, cable, etc.) and protocols (IPv4, IPv6, etc.) of the communication networks can also be used for the automation networks.

A building-external communication network refers to a network which does not belong to the building-internal communication or automation network, for example the internet 113 described above in FIG. 1. It can be for example a public network such as the internet, a telephone network of a telephone service provider, for example a wired network, such as a POTS, ISDN, DSL or cable network or a wireless network, such as a mobile communication network of a mobile network operator, such as a cellular network, for example using a mobile communication standard such as LTE, UMTS, GSM, etc. As protocols for the transfer of data via the building-external communication network, IPv4 or IPv6 can be used or ATM, STM or other long-distance communication standards.

The building-external authentication server of the building-external communication network, referred to as the "server" for short, can be an authentication server in which a device must be authenticated in order to gain access to a building-internal communication or automation network. The authentication server can have what is known as a "central service", for example as described above in FIG. 1 as a central service 114, via which authentication tasks are carried out. The authentication server can be provided at any desired location on the internet. The server can be a virtual server.

In the method and systems presented in the following, the authentication can take place on the basis of a credential or an access authorization. An access authorization or credential is a mechanism which is intended to confirm the identity of a user to a system. This usually takes place in the form of a username in conjunction with an authentication feature. For this purpose, a credential can comprise a secret number with several digits.

The server can be provided in the cloud. Cloud or cloud computing is to be understood to mean in this case the concept of providing abstracted IT infrastructures such as computing capacity, data storage, network capacities, ready-to-use software or in this case the server dynamically adapted to requirements via a network. The abstracted IT infrastructure provided is also referred to as cloud. Defined technical interfaces and protocols can define what these services offer and how they can be used.

A building-internal electrical component describes a unit, functional unit or entity in a building-internal communication network or building automation network. A building-internal electrical component can receive signals from the building-internal communication or automation network and/or send signals to the building-internal communication or automation network. A building-internal electrical component can be for example an actuator or sensor which has a modem, a network card, a network termination or a network adapter. A building-internal electrical component can comprise hardware and/or software in order to implement technical functions of the building-internal electrical components. A building-internal electrical component can comprise microprocessors, microchips, ASICs and/or DSPs.

The methods and systems presented in the following can be of different types. The individual elements described can be achieved by hardware or software components, for example electronic components which can be produced by means of various technologies and comprise for example semiconductor chips, ASICs, microprocessors, digital signal processors, integrated electric circuits, electro-optical circuits and/or passive components.

The methods and systems presented in the following can be used in access portals, control units and building-internal electrical components of building-internal communication and automation networks.

An access portal is a network entity which externally controls the access to a building-internal communication or automation network. The access portal can be realized as a gateway or hub, it can also comprise router functionalities or can be realized as a router itself. A building-internal electrical component refers to a component of said building-internal network. This can be for example a controllable actuator, for example a control element for heating, blinds, alarm systems, door locks, light switches, cookers, refrigerators, washing machines, coffee machines and dishwashers, or a controllable sensor, for example a temperature sensor, a pressure sensor, a light sensor, a light barrier, a clock or watch or a pair of glasses having a sensor function. The control element or sensor can also be a chip implanted in the body, as is known from keeping pets.

Aspects of the invention are based on the concept of creating efficient communication paths between a home automation system as shown in FIG. 1 and a remote control unit or control unit 118a, 118b as described above in FIG. 1 for operating the home automation system without knowing the whereabouts of the remote control unit 108a, 108b and independently of establishing a common physical radio connection.

For this purpose, the control unit communicates locally and directly with the home-control gateway so as to minimize the latency. The units set up a local communication channel or control channel to one another. In the home-control gateway, for this purpose, the originator address and a credential, that is to say an access authorization for authenticating the control unit against the home-control gateway, are recorded to each control unit of the home automation system. By comparing the data, the home-control gateway can detect whether a remote control unit or control unit is located locally in the region of the firewall-protected region of the home automation system and can set up a local connection via the home network or a global connection via the internet on a case-by-case basis. In particular however, for this purpose it is ensured that a control unit acquires the address of the connection end point of the access portal or home-control gateway. The authenticity of the device used is ascertained, in particular the authenticity is ascertained locally and globally, once and homogeneously. In this context, locally means that the control unit can carry out an authentication locally at the home-control gateway. In this context, globally means that the user can carry out an authentication at the central service. In this context, once means that a global authentication is valid locally. On the home-control gateway, it is not necessary to re-enter for example credentials or an access authorization. In this context, homogeneously means that the implementation uses the same mechanisms both during the global authentication and during the local authentication. This guarantees the simplicity of the implementation. The simplicity of the implementation is ensured by providing a suitable interface.

Both control units and the users thereof can be authenticated. In the following, for the sake of simplicity, it is assumed that it is the control unit that is authenticated rather than the user. The authentication of a user rather than the unit constitutes a variant.

According to a first aspect, the invention relates to a method for setting up a local control channel between a control unit for controlling at least one building-internal electrical component, which is connected to a building-internal access portal, and the building-internal access portal, comprising: authenticating the control unit against a building-external authentication server via a building-external communication network; transmitting a network address of the building-internal access portal by means of the building-external authentication server to the control unit in the case of a successful authentication of the control unit against the building-external authentication server via the building-external communication network; transmitting an access authorization for access to the building-internal access portal to the control unit by means of the building-external authentication server via the building-external communication network in the case of a successful authentication of the control unit against the building-external authentication server via the building-external communication network; and setting up the local control channel between the control unit and the building-internal access portal in response to receiving the network address of the building-internal access portal and the access authorization.

This is advantageous in that the latency for controlling an electrical component of the building-internal communication network by means of the control unit is very short because the control channel is set up locally. The user has the sense of a switching operation initiated on the control unit being implemented immediately. The process of switching on a lamp for example is followed immediately by the process of switching the electric circuit for the light.

Furthermore, the authenticity of the user operating the control unit is ascertained.

The user can be sure that only they themselves or only a specific group of users is authorised to control applications.

According to one embodiment of the method, the at least one building-internal electrical component is a controllable actuator or a controllable sensor.

This is advantageous in that controllable actuators or controllable sensors can be controlled via the local control channel so that the user of the control unit immediately perceives a result after inputting a command, for example that the actuator performs an action or that the sensor provides measured data.

According to one embodiment of the method, the controllable actuator is a control element for one in particular of the following appliances: heating, blinds, alarm systems, door locks, light switches, cookers, refrigerators, washing machines, coffee machines, dishwashers.

This is advantageous in that, when controlling via the local control channel, the respective appliances react immediately, that is to say that heating starts up immediately, blinds close immediately, etc. In addition, the method is fault-tolerant because the control via the local control channel is independent of the status of the building-external network.

According to one embodiment of the method, the controllable sensor is a temperature sensor, a pressure sensor, a light sensor or a light barrier.

This is advantageous in that, when controlling via the local control channel, the respective appliances react immediately, that is to say that the temperature sensor provides immediately measured temperature values, the pressure sensor provides an immediately measured pressure, etc.

According to one embodiment of the method, the network address and the access authorization are transmitted at the same time or one after the other.

This is advantageous in that, when the network address and the access authorization are transmitted at the same time, the transmission can be made in one message, and thus the delay to the set-up of the control channel is reduced. Transmitting one after the other has the advantage that the network address and access authorization can be transmitted independently of one another and the method is thus more bug-proof.

According to one embodiment, the method comprises establishing an allocation between the control unit and the access portal in the building-external authentication server based on enabling the control unit in order to control the building-internal electrical component which is connected to the building-internal access portal.

This is advantageous in that only control units which are registered in the building-external authentication server via the allocation are authorised to control the building-internal electrical component(s). This makes the method secure against unauthorised control.

According to one embodiment, the method comprises controlling the at least one building-internal electrical component, which is connected to the building-internal access portal, by means of the control unit via the set-up local control channel.

This is advantageous in that the control of the building-internal electrical component via the local control channel is secure and responds quickly.

According to one embodiment, the method comprises controlling the at least one building-internal electrical component, which is connected to the building-internal access portal, by means of the control unit via the set-up local control channel by bypassing the building-external communication network.

This is advantageous in that, when bypassing the building-external communication network, a failure or impairment of said network has no effect on the controllability of the electrical components of the building-internal network. The method is thus independent of the status of the building-external communication network.

According to one embodiment of the method, the network address of the building-internal access portal is an IP address, in particular an IP address of the IPv4 or IPv6 version.

This is advantageous in that a standard IP stack can be used in the method, which is available everywhere. This reduces the development required.

According to one embodiment of the method, the network address of the building-internal access portal is located in the address space or in the address subspace of the building-internal communication network.

This is advantageous in that standard protocols such as IPv4 or IPv6 can be used to set up the connection.

According to one embodiment, the method comprises transmitting the network address and the access authorization of the building-internal access portal by means of the building-internal access portal to the building-external authentication server; and saving an allocation between an identity of the building-internal access portal and the transmitted network address and access authorization of the building-internal access portal in a memory of the building-external authentication server, in particular in the form of a table.

This is advantageous in that the authentication server can verify the authorization of a control unit simply, that is to say quickly, by checking whether there is an allocation to an access portal.

According to one embodiment of the method, the building-internal access portal is a gateway, in particular a home automation gateway, a gateway having router functionality or a router.

A gateway is advantageous in that one is now already used in many home networks, and therefore the method can be used directly in these environments. A gateway having router functionality or a router is advantageous in that relatively complex control tasks can be carried out thereby.

According to one embodiment of the method, the building-internal access portal grants access to one in particular of the following building-internal networks: a building automation network, home automation network, industrial automation network, Smart Home network, Smart Metering network, household appliance automation network, entertainment electronics automation network, Internet of Things. This is advantageous in that the method can be used in a plurality of networks, as indicated above by way of example, in order to control said networks quickly and securely.

According to one embodiment of the method, the building-external communication network is the internet. This is advantageous in that the internet is available in all locations.

According to one embodiment, the authentication of the control unit against the building-external authentication sever is carried out firstly via a building-internal communication network and subsequently via the building-external communication network.

According to a second aspect, the invention relates to an access portal for at least one building-internal electrical component, which is connected to the access portal, comprising: an access information unit which is configured to record a network address of the building-internal access portal and an access authorization for the building-internal access portal in an authentication server of a building-external communication network; and a communication interface which is configured, in response to a request of a control unit to control the at least one building-internal electrical component, to set up a local control channel to the control unit when the request comprises the access authorization recorded in the authentication server.

This is advantageous in that such an access portal makes it possible to set up a local control channel in order to thereby keep the latency for controlling an electrical component of the building-internal communication network by means of the control unit very short. The user thus has the sense of a switching operation initiated on the control unit being implemented immediately via the access portal. The process of switching on a lamp for example is followed immediately by the process of switching the electric circuit for the light.

According to one embodiment, the access portal manipulates the control of the at least one building-internal electrical component by means of the control unit, more particularly the control is only carried out at a predetermined time or is or is not carried out depending on other switching operations or appliance statuses.

According to a third aspect, the invention relates to an access system for a building-internal communication network, comprising: a building-internal access portal for at least one building-internal electrical component, which is connected to the access portal; an authentication server which can be reached via a building-external communication network; and a control unit for controlling the at least one building-internal electrical component, wherein the building-internal access portal is configured to record a network address of the building-internal access portal and an access authorization for the building-internal access portal in the authentication server; and, in response to a request of the control unit, to set up a local control channel to the control unit when the request comprises the access authorization recorded in the authentication server, wherein the authentication server is configured, in response to a request of the control unit for a network address of the building-internal access portal and an access authorization for the building-internal access portal whilst authenticating the control unit in the authentication server, to transmit the requested network address and the requested access authorization to the control unit in the case of a successful authentication of the control unit and there is an allocation between the control unit and the building-internal access portal in the authentication server; and wherein the control unit is configured, in the authentication server, to request a network address of the building-internal access portal and an access authorization for the access portal whilst authenticating the control unit in the authentication server, and to set up a local control channel to the building-internal access portal based on the network address of the building-internal access portal which is transmitted by the server using the transmitted access authorization.

This is advantageous in that such an access system allows disturbance-tolerant and quick-reacting control of a home-control gateway or access portal via a control unit by setting up a local control channel. By means of the local control channel, the latency for controlling an electrical component of the building-internal communication network by means of the control unit is to be kept very short. The user thus has the sense of a switching operation initiated on the control unit being implemented immediately via the access portal. The process of switching on a lamp for example is followed immediately by the process of switching the electric circuit for the light.

According to a fourth aspect, the invention relates to a method for authenticating a control unit for controlling at least one building-internal electrical component, which is connected to a building-internal access portal, in a building-external authentication server via a building-external communication network, comprising: transmitting a request of the control unit to the building-external authentication server after an access authorization for the building-internal access portal whilst quoting an identification of the control unit; and checking by means of the building-external authentication server whether, for the identification of the control unit, an allocation to an access authorization for the building-internal access portal is present in a memory of the building-external authentication server, wherein the authentication is successful when the allocation from the control unit to the access authorization for the building-internal access portal is present in the memory of the building-external authorization server.

This is advantageous in that the authenticity of the user operating the control unit is ascertained. The user can be sure that only they themselves or only a specific group of users is authorized to control applications. The allocation from the control unit to the access portal in the authentication server offers a simple and efficient way of controlling access to the building-internal network.

In the following detailed description, reference is made to the accompanying drawings, which form part thereof and in which specific embodiments in which the invention can be implemented are shown by way of illustration. It is understood that other embodiments can also be used and structural or logical changes can be made without deviating from the concept of the present invention. The following detailed description is therefore not to be understood in a restrictive sense. It is further understood that the features of the various embodiments described herein can be combined unless specifically indicated otherwise.

The aspects and embodiments are described with reference to the drawings, wherein like reference numerals generally relate to like elements. In the following description, numerous specific details are presented for explanatory purposes so as to provide a thorough understanding of one or more aspects of the invention. However, to a person skilled in the art, it may be clear that one or more aspects or embodiments can be implemented with the specific details to a lesser degree. In other cases, known structures and elements are shown schematically in order to make it easier to describe one or more aspects or embodiments. It is understood that other embodiments can be used and structural or logical changes can be made without deviating from the concept of the present invention.

Even if a particular feature or a particular aspect of an embodiment may have been disclosed with respect to only one of several implementations, a feature of this type or an aspect of this type can also be combined with one or more other features or aspects of the other implementations as may be desirable and advantageous for a given or particular application. Furthermore, to the extent that the expressions "contain", "have", "comprise" or other variants thereof have been used either in the detailed description or in the claims, such expressions should be inclusive, in a similar manner to the expression "include". The expressions "coupled" and "connected" may have been used together with derivatives thereof. It is understood that such expressions are used to indicate that two elements cooperate or interact with one another regardless of whether they are in direct physical or electrical contact or are not in direct contact with one another. In addition, the expression "by way of example" is merely to be taken as an example rather than an indication of the best or optimal option. The following description is therefore not to be understood in a restrictive sense.

Figure 2:
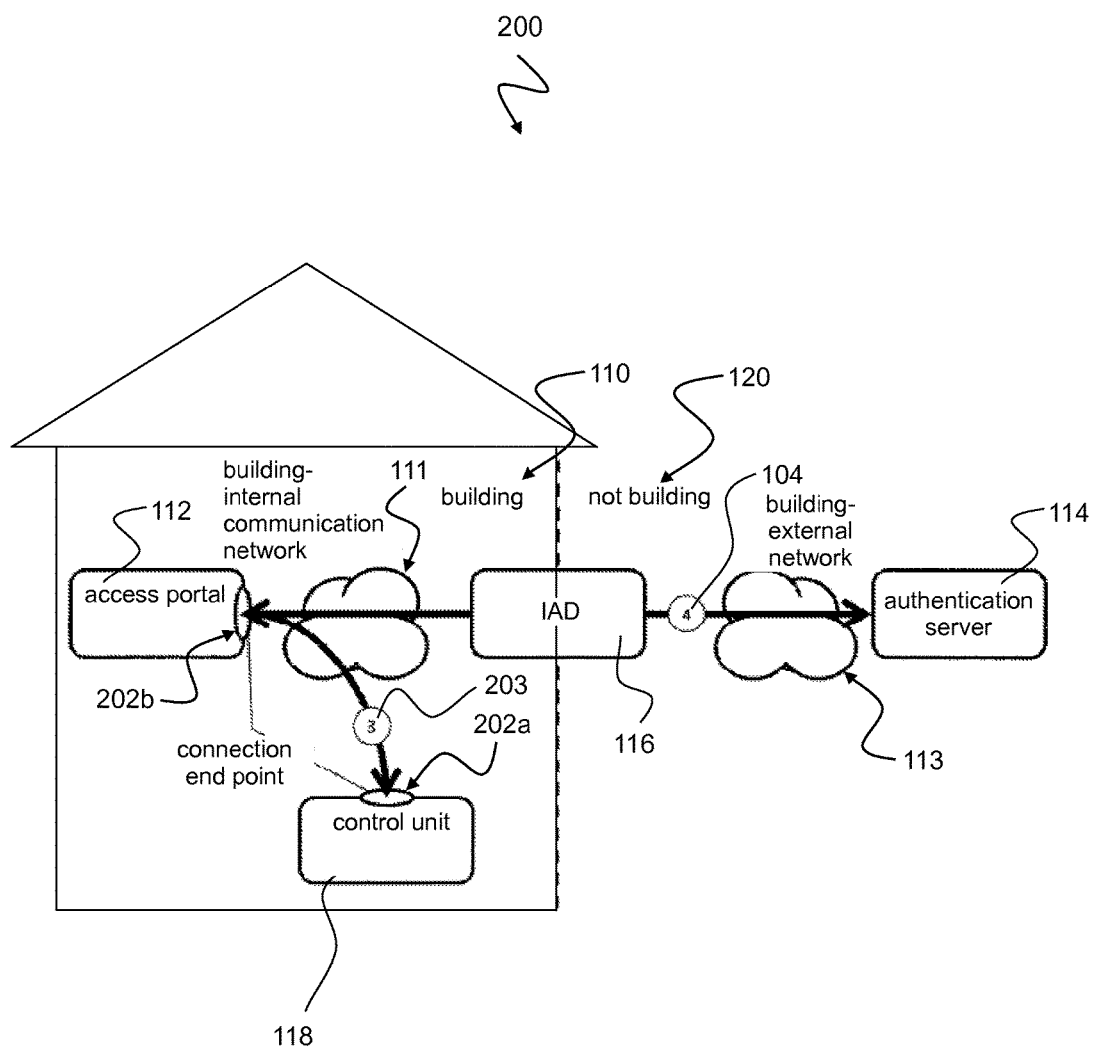
FIG. 2 is a schematic view of the topology of an access system 200 for a building-internal communication network with direct communication between the access portal and the control unit according to one embodiment.

FIG. 2 is a schematic view of the topology of an access system 200 for a building-internal automation network with direct communication 203 between the access portal 112 and the control unit 118 according to one embodiment.

Figure 1:
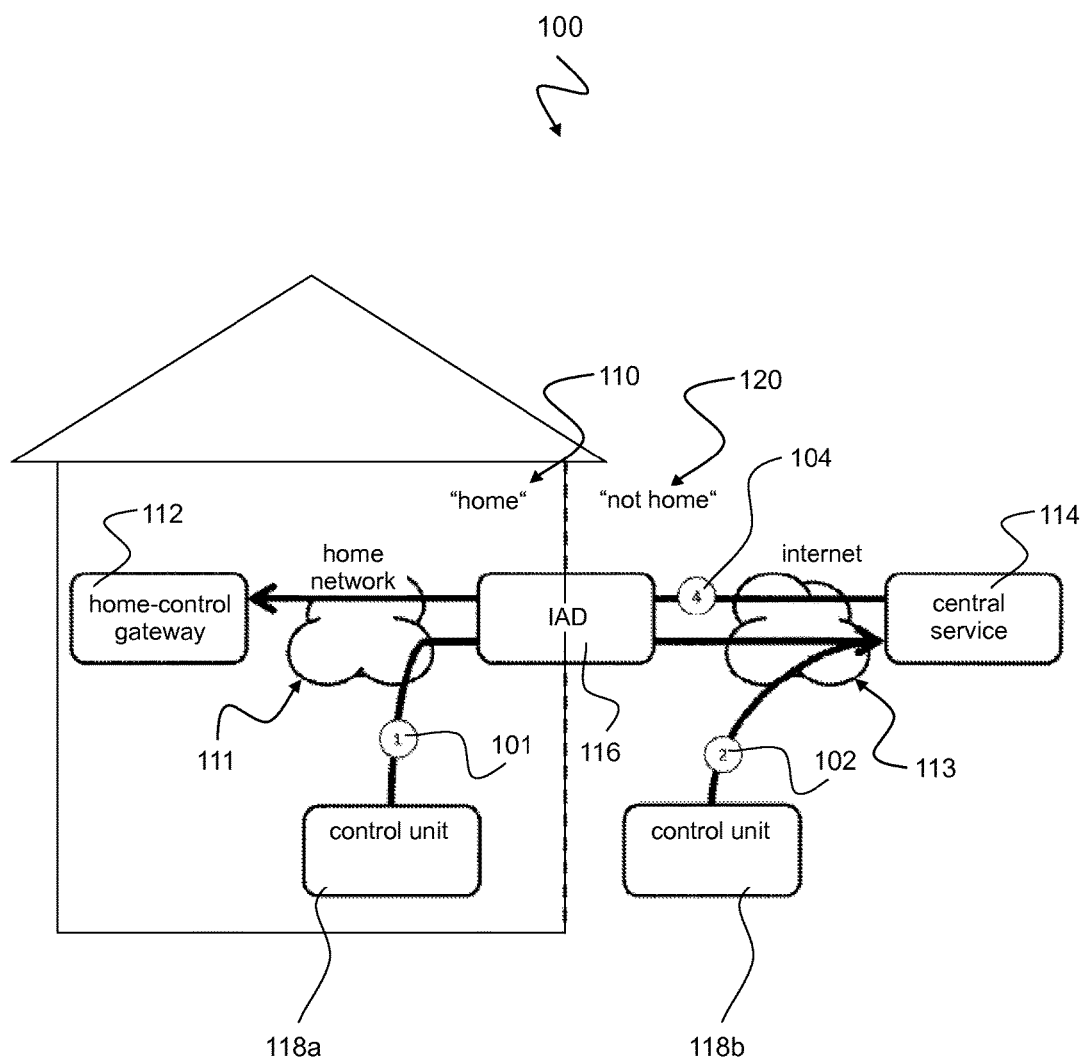
FIG. 1 is a schematic view of the topology of a home automation network 100 with communication between the home-control gateway and the control unit via the central service.

For the rest of the description, the topology shown in FIG. 2 is taken as the basis for the home automation, which follows the topology shown in FIG. 1. The access portal 112 described in FIG. 2 can thus be a home-control gateway as described in FIG. 1. The control unit 118 from FIG. 2 can correspond to one of the control units 118a, 118b described in FIG. 1. The building-internal network 111 from FIG. 2 can be a home network, as described in FIG. 1. The building-external network 113 from FIG. 2 can be the internet, as described in FIG. 1. The authentication server 114 described in FIG. 2 can comprise the central service, as described in FIG. 1.

The building 110 described in FIG. 2 can represent a "home", as described in FIG. 1. The "not building" 120 described in FIG. 2 or the region outside the building can represent the "not home", as described in FIG. 1. The IAD 116 described in FIG. 2 can correspond to the IAD shown in FIG. 1.

In particular in order to reduce the latency and when the control units are located in the "home" or in the "building" 110, said control units can be permitted to directly communicate with the access portal 112. That is to say that the communication connections 1 and 4 in FIG. 1, which require a relatively long latency, are "redirected" to the communication connection 3 in FIG. 2, which for its part requires only a short latency. "Home" or building 110 or building-internal is distinguished in that the communication partners communicate via a home network or a building-internal network 111, for example a LAN. By contrast, the "not home" or "not building" or building-external is distinguished in that the communication partners communicate via a remote connection network 113, for example the internet.

Applications for home control or building control or automation can be operated on a home-control gateway or a building-internal access portal 112. The home-control gateway or the access portal 112 in this case can communicate on the one hand with the actuators and sensors, that is to say electrical components of the building-internal network such as heating controls or light switches. This communication is not shown in FIG. 2. On the other hand, the home-control gateway or access portal 112 can communicate with control units, such as tablet PCs or smartphones. Said units can thus control the home automation technology.

Applications for home control or building automation can be operated on the central service or on the authentication server 114. The central service or the authentication server 114 in this case can communicate on the one hand with the home-control gateway or access portal 112 and thus indirectly control the actuators and sensors, e.g. the heating controls or light switches. On the other hand, the central service or the authentication server 114 can communicate with control units 118, such as tablet PCs or smartphones. Said units can thus control the central service or the authentication server 114.

The central service or the authentication server 114 only needs to be provided once, whereas there can be a plurality of control units 118; one in each "home" or building 110.

The control units 118 can communicate with the home-control gateway or access portal 112 or with the central service or the authentication server 114. Said units can thus indirectly control the actuators and sensors of the home control. Control units 118 can be for example tablet PCs or smartphones. The communication between the control unit 118 and the home-control gateway or access portal 112 in this case can take place either locally via the home network or the building-internal network 111 or via the internet or the building-external network 113. This is shown in various variants in FIG. 2.

The home network or the building-internal network 111 can connect in particular the home-control gateway or access portal 112, control units 118 and the IAD 116 in the "home" or in the building 110, and allow these entities to communicate with one another. The home network or building-internal network 111 can be for example an IP-based LAN.

The internet or the building-external network can connect, in particular by means of the IAD 116, the home network or the building-internal network 111, control units 118 and the central service or the authentication server 114 in the "not home" or outside the building 120 and allow these entities to communicate with one another. The building-external network 113 can be the internet. The connection end points 202a, 202b or the addresses or network addresses thereof make it possible to clearly address the communication partners involved.

The internet access device (IAD) 116 is a device which can be physically located in the "home" or in the building 110 and can allow communication between the home network or the building-internal network 111 and the internet or the building-external network. The IAD 116 is not necessarily required to set up the local control channel 203. A connection to the authentication server 114 also cannot be established if the IAD 116 is not present.

As shown in FIG. 2, the access system 200 comprises a building-internal access portal 112 for a building-internal electrical component, which is connected to the access portal 112; an authentication server 114 of a building-external communication network 113; and a control unit 118 for controlling the building-internal electrical component.

In this case, the set-up of the local control channel 203 can take place as follows:

The building-internal access portal 112 records the network address 202b thereof and an access authorization for access to the building-internal access portal 112 in the authentication server 114.

The control unit 118 requests, in the authentication server 114, a network address 202b of the building-internal access portal 112 and an access authorization for the access portal 112 whilst authenticating the control unit 118 in the authentication server 114.

The authentication server 114 transmits, in response to the request of the control unit 118 for the network address 202b of the building-internal access portal 112 and the access authorization for the building-internal access portal 112 whilst authenticating the control unit 118 in the authentication server 114, the requested network address 202b and the requested access authorization to the control unit 118 as long as the control unit 118 has successfully been authenticated and there is an allocation 411 between the control unit 118 and the building-internal access portal 112 in the authentication server 114.

Based on the network address 202b of the building-internal access portal 112 which is transmitted by the server 114, the control unit 118 sets up the a local control channel 203 to the building-internal access portal 112 using the transmitted access authorization.

In another embodiment which is not described in greater detail, the set-up of the local control channel 203 can also be initiated by the access portal 112. For this purpose, the local address of the control unit can be transmitted to the access portal.

Figure 5:
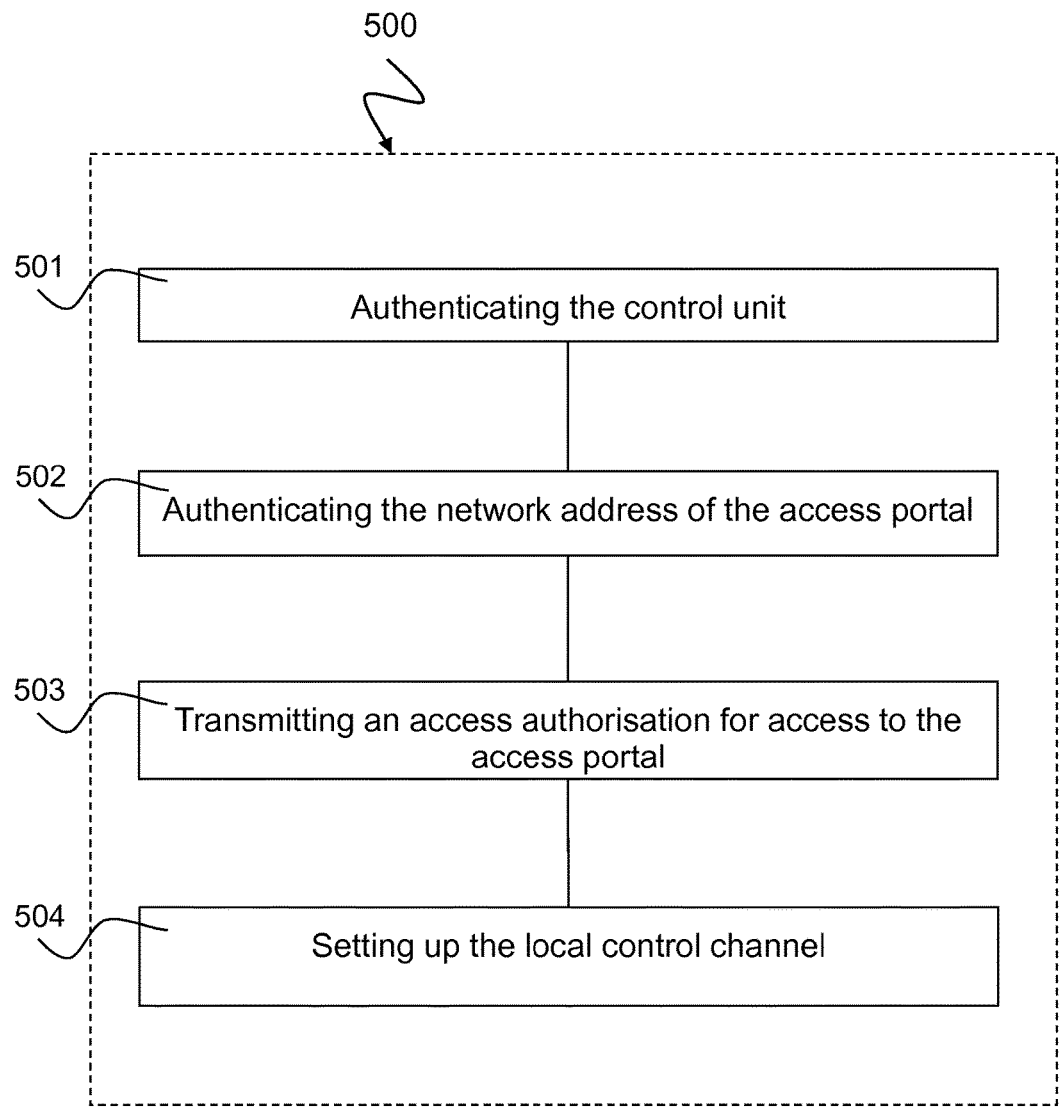
FIG. 5 is a schematic view of a method 500 for setting up a local control channel between a control unit and a building-internal access portal according to one embodiment.
Figure 6:
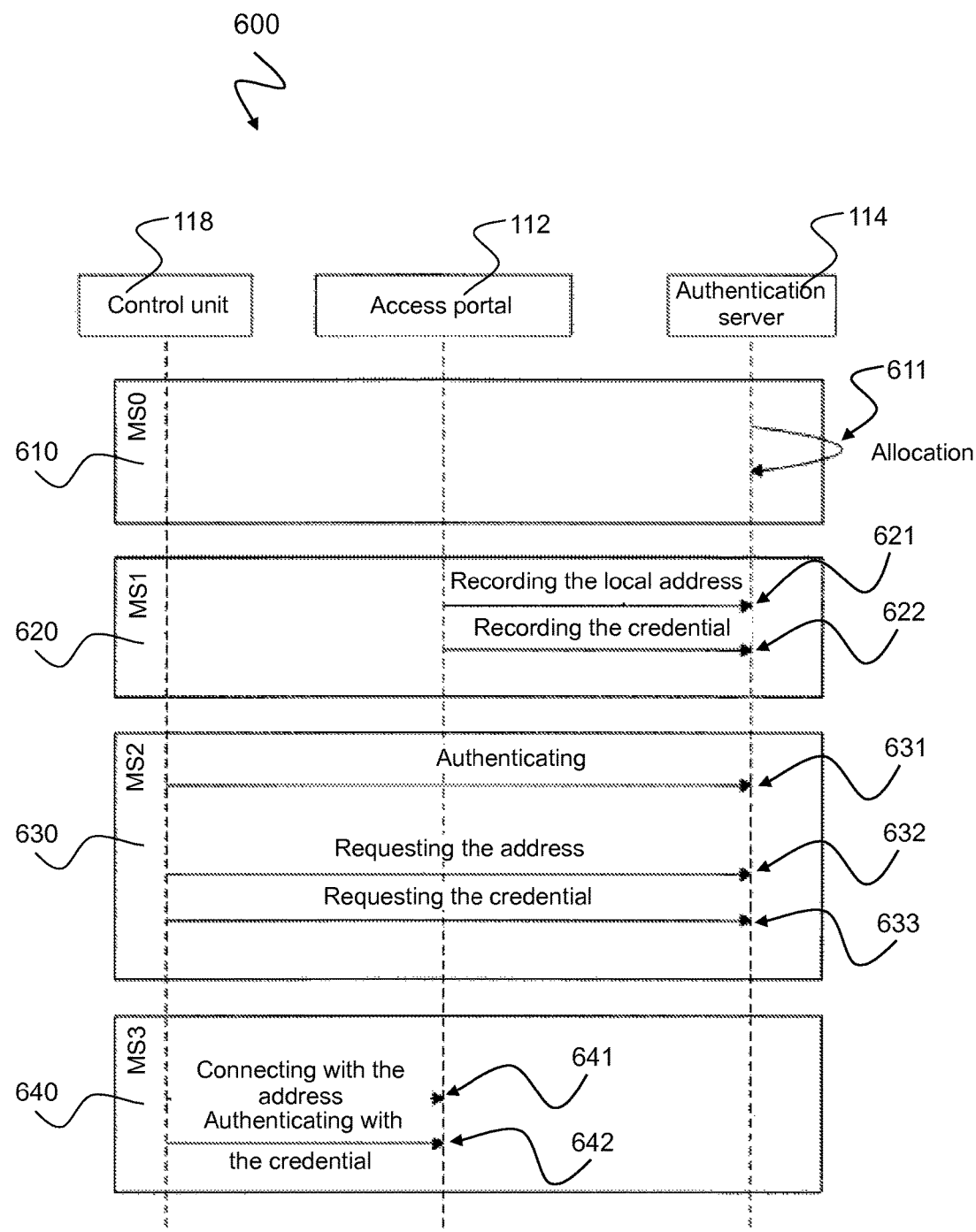
FIG. 6 is a schematic view of a method 600 for setting up a local control channel between a control unit and a building-internal access portal according to another embodiment.

The details about the set-up of the local control channel 203 can be found in the description of FIGS. 5 and 6.

FIG. 2 merely shows an access portal 112 or home-control gateway. It is understood that the control unit 118 can also set up local communication channels to additional access portals which are not shown in FIG. 2.

FIG. 3 is a schematic view of the topology of an access system 300 in which the access portal 112 grants access to the individual sensors/actuators via an automation network 320, according to one embodiment. The access portal 112 is connected to the sensors/actuators 311, 312, 313 of the building-internal communication network 111 or home network via the automation network 320. The automation network 320 can comprise a plurality of device networks 321, 322, 323 in order to connect the access portal 112 to individual building-internal electrical components 311, 312, 313 via respective device networks.

The access portal controls the access to the automation network 320 and thus to the device networks 321, 322, 323. The automation network 320 connects the home automation appliances such as the individual actuators and sensors 311, 312, 313 to the access portal 112. In one embodiment, the automation network 300 comprises not just one device network, but rather a plurality of device networks 321, 322, 323, as shown in FIG. 3, for example one device network per technology or per manufacturer. All the device networks 321, 322, 323 are "watched" by the one access portal 112.

In a specific embodiment, the home network or the building-internal communication network 111 itself can be understood to be a device network, that is to say that it can coincide with a device network.

Figure 4:
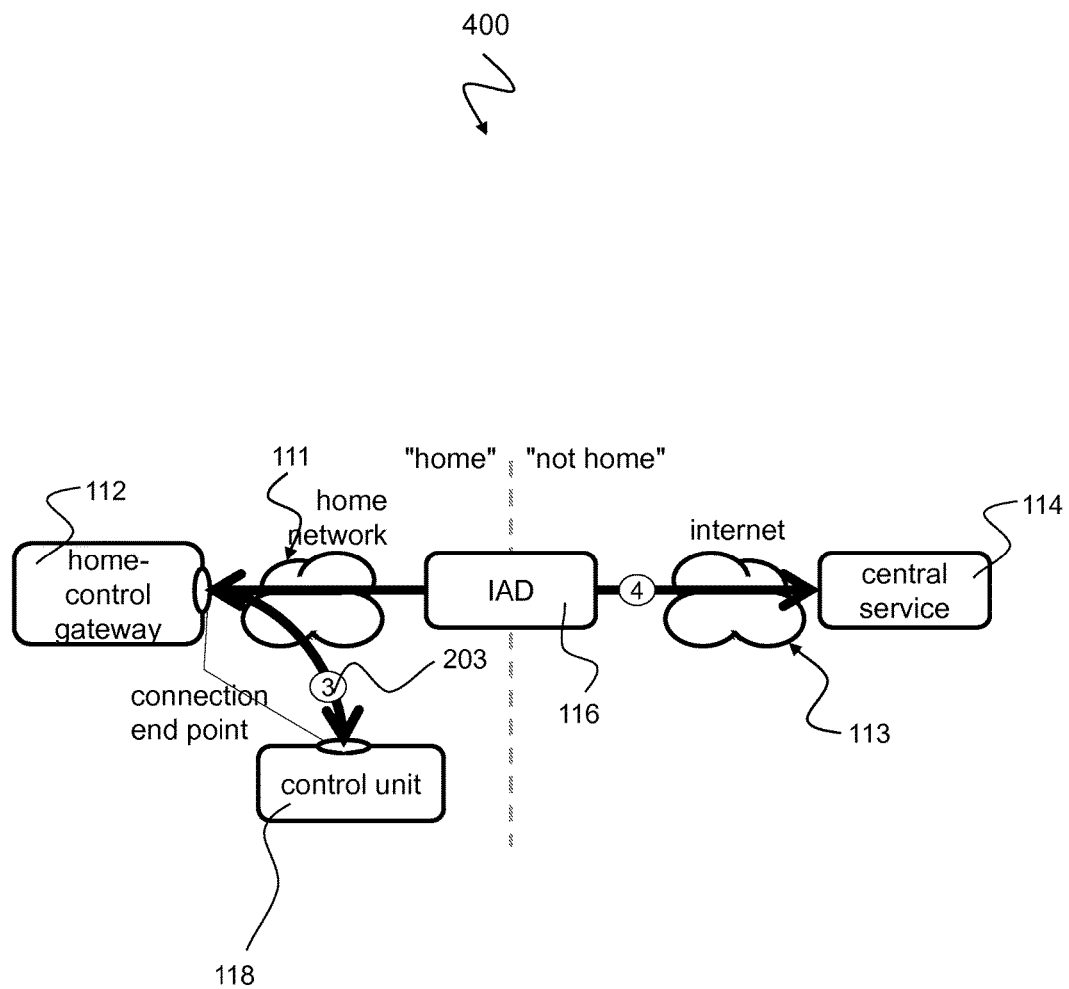
FIG. 4 is a schematic view of the topology of an access system 400 for a building-internal communication network according to another embodiment.

FIG. 4 is a schematic view of the topology of an access system 400 for a building-internal communication network according to another embodiment. The access system 400 corresponds to the access system 200 described in FIG. 2, wherein the access portal 112 is realized as a home-control gateway and the authentication server 114 is realized as a central service according to the view in FIG. 1.

FIG. 5 is a schematic view of a method 500 for setting up a local control channel between a control unit and a building-internal access portal according to one embodiment.

The method 500 for setting up a local control channel 203 corresponding to the view in FIG. 2 between a control unit 118 for controlling a building-internal electrical component, which is connected to a building-internal access portal 112, and the building-internal access portal 112 comprises the four steps 501, 502, 503, 504 shown in FIG. 3. These steps are as follows: authenticating 501 the control unit 118 against a building-external authentication server 114 via a building-external communication network; transmitting 502 a network address 202b of the building-internal access portal 112 by means of the building-external authentication server 114 to the control unit 118 in the case of a successful authentication of the control unit 118 against the building-external authentication server 114 via the building-external communication network 113; transmitting 503 an access authorization for access to the building-internal access portal 112 to the control unit 118 by means of the building-external authentication server 114 via the building-external communication network 113 in the case of a successful authentication of the control unit 118 against the building-external authentication server 114 via the building-external communication network 113; and setting up 304 the local control channel 203 between the control unit 118 and the building-internal access portal 112 in response to receiving the network address 202b of the building-internal access portal 112 and the access authorization.

The building-internal electrical component can be a controllable actuator or a controllable sensor. The controllable actuator can be a control element for one of the following appliances: heating, blinds, alarm systems, door locks, light switches, cookers, refrigerators, washing machines, coffee machines, dishwashers. The controllable sensor can be a temperature sensor, a pressure sensor, a light sensor or a light barrier.

The network address 202b and the access authorization can be transmitted at the same time or one after the other.

The method 500 can further comprise establishing an allocation 611 between the control unit 118 and the access portal 112 in the building-external authentication server 114 based on enabling the control unit 118 in order to control the building-internal electrical component which is connected to the building-internal access portal 112.

The method 500 can further comprise controlling the building-internal electrical component, which is connected to the building-internal access portal 112, by means of the control unit 118 via the set-up local control channel 203.

The method 500 can further comprise controlling the building-internal electrical component, which is connected to the building-internal access portal 112, by means of the control unit 118 via the set-up local control channel 203 by bypassing the building-external communication network 113.

The network address 202b of the building-internal access portal 112 can be an IP address, in particular of the IPv4 or IPv6 version.

The network address 202b of the building-internal access portal 112 can be in the address space or in the address subspace of the building-internal communication network 111.

The method 500 can further comprise transmitting the network address 202b and the access authorization of the building-internal access portal 112 by means of the building-internal access portal 112 to the building-external authentication server 114 and can comprise saving an allocation 411 between an identity of the building-internal access portal 112 and the transmitted network address 202b and access authorization of the building-internal access portal 112 in a memory of the building-external authentication server 114, in particular in the form of a table.

The building-internal access portal 112 can be a gateway, in particular a home automation gateway, a gateway having router functionality or a router.

The building-internal access portal 112 can grant access to one of the following building-internal networks 111: a building automation network, home automation network, industrial automation network, Smart Home network, Smart Metering network, household appliance automation network, entertainment electronics automation network, Internet of Things. The building-external communication network 113 can be the internet.

Another embodiment of the method 500 is shown in FIG. 6.

FIG. 6 is a schematic view of a method 600 for setting up a local control channel between a control unit 118 and a building-internal access portal 112 corresponding to the view in FIG. 2 according to another embodiment.

The method 600 comprises the four method steps MS0 610, MS1 620, MS2 630 and MS3 640, wherein in each of the steps, sub-steps are carried out as described in the following.

Method step 0 comprises previous actions, such as the allocation 611 of the control unit 118 to the building-internal access portal 112 or home-control gateway. The authentication server 114 or the central service can have an allocation 611 from a control unit 118 to an access portal 112 or home-control gateway. The allocation 611 can signify that the access portal 112 or the home-control gateway may be controlled by said control unit 118. The authentication server 114 or the central service can record said allocation 611 for example in a table. The creation and the maintenance of said allocation 611 can be carried out in various ways, which will not be described in greater detail here. The allocation 611 can change at any time whilst the method 600 is being carried out. The method 600 can deal with these dynamics.

Both the access portal 112 or home-control gateway and the control unit 118 can communicate with the authentication server 114 or the central service after logging into the building-internal network 111 or home network, provided that the connection is available.

Method step 1 comprises recording the address of the access portal 112 or home-control gateway. The access portal 112 or home-control gateway can record the local address thereof in the authentication server 114 or central service 621. In the case of this invocation 621, the access portal 112 or home-control gateway can transmit its own identity at the same time or shortly therebefore or thereafter. The authentication server 114 or central service can record an allocation from the access portal 112 or home-control gateway and the local address thereof for example in the form of a table. A usage context, for example a session, can be applied, in the course of which these sub-steps, storing the address 621, recording the credential 622 and transmitting the identity, can take place.

The access portal 112 or the home-control gateway can generate a credential and record the credential in the authentication server 114 or central service 622. The authentication server 114 or central service can record an allocation from the access portal 112 or home-control gateway and the credential for example in the form of a table.

The credential can be a very long number which de facto cannot be guessed.

Method step 2 comprises retrieving the address of the access portal 112 or home-control gateway.

The control unit 118 can be authenticated in the authentication server 114 or central service 631. A usage context, for example a session, can be applied, in the course of which the next sub-step, retrieving 633 the credential, can take place.

The control unit can retrieve the recorded local address of the access portal 112 or home-control gateway 632. The address can be returned from the authentication server 114 or central service to the control unit 118.

The control unit can additionally retrieve the recorded credential of the access portal 112 or home-control gateway in the authentication server 114 or central service 633. The credential can be returned from the authentication server 114 or central service to the control unit 118. The authentication server 114 or central service can have at its command the above-mentioned allocation 611 between the control unit 118 and the access portal 112 or home-control gateway, which is allocated to the control unit 118. The authentication server 114 or central service can thus also identify the credential, which in turn is allocated to the access portal 112 or home-control gateway.

Method step 4 comprises authorising the control unit 118. Using the local address, a connection 641 can be established between the control unit 118 and the access portal 112 or home-control gateway. The control unit 118 can authenticate 642 its right of use on the access portal 112 or home-control gateway with the credential.

Additional embodiments of the method 600 are described in the following.

In one embodiment, it is unimportant for the method 600 whether the object controlled by the control unit 118 is operated on a dedicated hardware of an access portal 112 or home-control gateway, or on another appliance such as a refrigerator or a television, or whether the access portal 112 or home-control gateway is some other type of virtual instance.

In one embodiment, however, it is important for the method 600 for the access portal 112 or home-control gateway to be located in the customer's home network.

In one embodiment, it is unimportant for the method 600 where the technical logic for the home control or building control of an application is provided. This can take place only on the access portal 112 or home-control gateway, only on the authentication server 114 or central service, or shared between the access portal 112 or home-control gateway and the authentication server 114 or central service.

In one embodiment, it is unimportant for the method 600 whether the building-internal network 111 or home network is an internet-protocol (IP) based network, or whether it is another type of suitable network technology. The above-described example which is described on the basis of an IP-based LAN, merely represents a specific embodiment of the method 600.

In one embodiment, however, it is important for the method 600 for the building-internal network 111 or home network to address connection end points 202a, 202b via clear addresses, for example network addresses.

In one embodiment, it is unimportant for the method 600 whether the term "internet" used in this document is the generally known, IP-based internet, or whether it is another type of suitable network technology. In this sense, the internet merely represents a specific embodiment for the method 600.

In one embodiment, however, it is important for the method 600 for the internet to address connection end points via clear addresses, for example network addresses.

In one embodiment, it is unimportant for the method 600 whether the building-internal network 111 or home network connects to the building-external network 113, for example to the internet, via an IAD 116. The use of an IAD 116, as described above in FIG. 2, merely represents a specific embodiment of the method 600.

In one embodiment, it is unimportant for the method 600 whether a control unit 118, which communicates directly with the access portal 112 or home-control gateway, is located in the building-internal network 111 or home network, or whether it communicates from the building-external network 113, for example the internet, directly (and without going via the authentication server 114 or the central service) with the control unit 118. This direct communication is easy for example by using IP version 6. In addition, the use of IP version 4 can also be provided.

In one embodiment, it is unimportant for the method 600 whether it is the control unit 118 which sets up the connection to the access portal 112 or home-control gateway, or conversely, it is the access portal 112 or home-control gateway which sets up the connection to the control unit 118. The example indicated above, in which the control unit 118 sets up the connection, merely represents a specific embodiment of the method 600.

In one embodiment, it is unimportant for the method 600 whether the connections between the systems involved are encrypted or not. The example given above assumes implicitly, that is to say without explicitly stating it, that the connections are unencrypted. This merely represents a specific embodiment of the method 600. Another embodiment establishes for example connections secured with SSL. Other embodiments are possible.

In one embodiment, it is unimportant for the method 600 whether it is the control unit 118 which is authenticated against the authentication server 114 or central service with suitable credentials, or whether this is done by a user, for example with a username and password. The example given above, in which the control unit 118 is authenticated, merely represents a specific embodiment of the method 600.

In one embodiment, it is unimportant for the method 600 whether the authentication server 114 or the central service makes an allocation 611 from precisely one control unit 118 to precisely one access portal 112 or home automation gateway, or whether this allocation 611 can also be an n-to-m relationship. The example given above, in which a 1-to-1 allocation 611 is described, merely represents a specific embodiment of the method 600.

In one embodiment, it is unimportant for the method 600 whether one and the same credential applies to all control units 118, or whether one credential authenticates precisely one single control unit 118. The example indicated above describes the case of a single, universal credential. This merely represents a specific embodiment of the method 600.

In one embodiment, it is unimportant for the method 600 whether a credential for example can be invalidated by a user during its "lifetime", or whether this is not possible. The example indicated above assumes implicitly, that is to say without explicitly stating it, that the credential cannot be invalidated. This merely represents a specific embodiment of the method 600.

In one embodiment, it is unimportant for the method 600 whether a credential is generated by the access portal 112 or home-control gateway, the authentication server 114 or the central service, or optionally by another system element. The example indicated above, in which the credential is issued by the access portal 112 or the home-control gateway, merely represents a specific embodiment of the method 600.

In one embodiment, it is unimportant for the method 600 whether a credential is provided with a validity period or not. The example indicated above, in which the credential is issued without a validity period, merely represents a specific embodiment of the method 600.

In one embodiment, it is unimportant for the method 600 whether a credential has the syntax "a long number" or not. The example indicated above, in which the credential is issued as "a long number", merely represents a specific embodiment of the method 600. There are also several other possibilities, for example using token technology.

Figure 7:
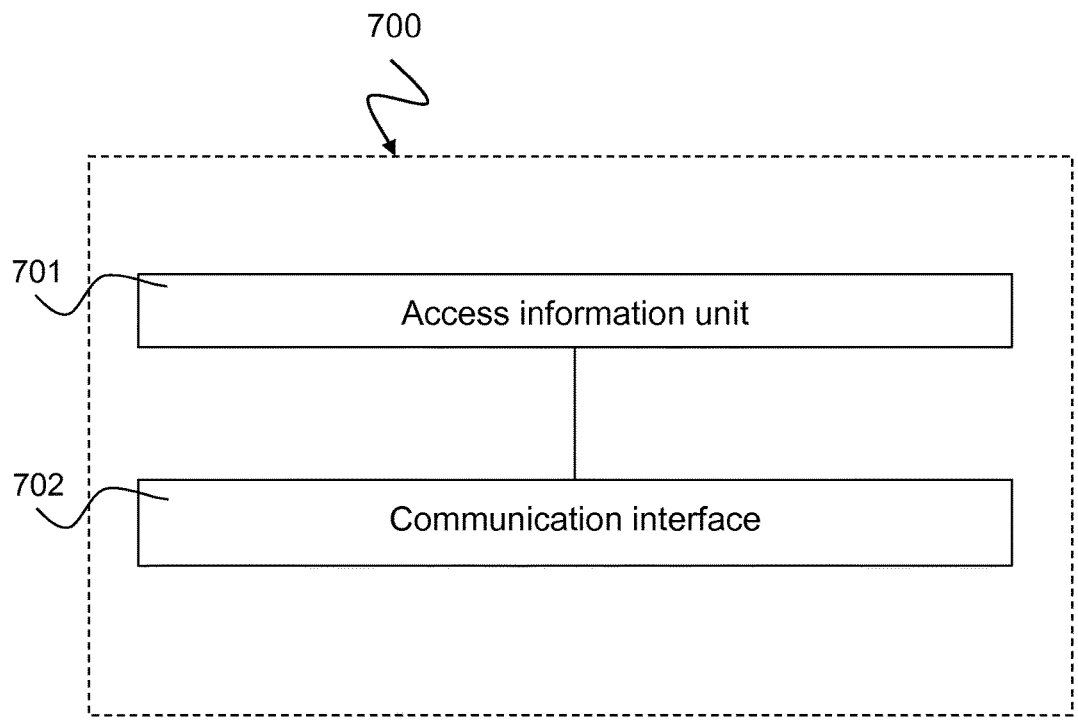
FIG. 7 is a schematic view of an access portal 700 for a building-internal electrical component according to one embodiment.

FIG. 7 is a schematic view of an access portal 700 for a building-internal electrical component, which is connected to the access portal, according to one embodiment. The access portal 700 can correspond to the home-control gateway or the access portal 112 described in FIG. 2. The access portal 700 can correspond to the home-control gateway or the access portal 112 described in FIGS. 5 and 6.

The access portal 700 comprises an access information unit 701 and a communication interface 702. The access information unit 701 is configured to record a network address of the building-internal access portal 700 and an access authorization for the building-internal access portal 700 in an authentication server 114 of a building-external communication network 113.

The communication interface 702 is configured, in response to a request of a control unit 118, for example a control unit as described in FIGS. 2 to 4, to control the building-internal electrical component to set up a local control channel 203 to the control unit 118 when the request comprises the access authorization recorded in the authentication server 114. The local control channel 203 can be set up as described in FIGS. 2 to 6.

Figure 8:
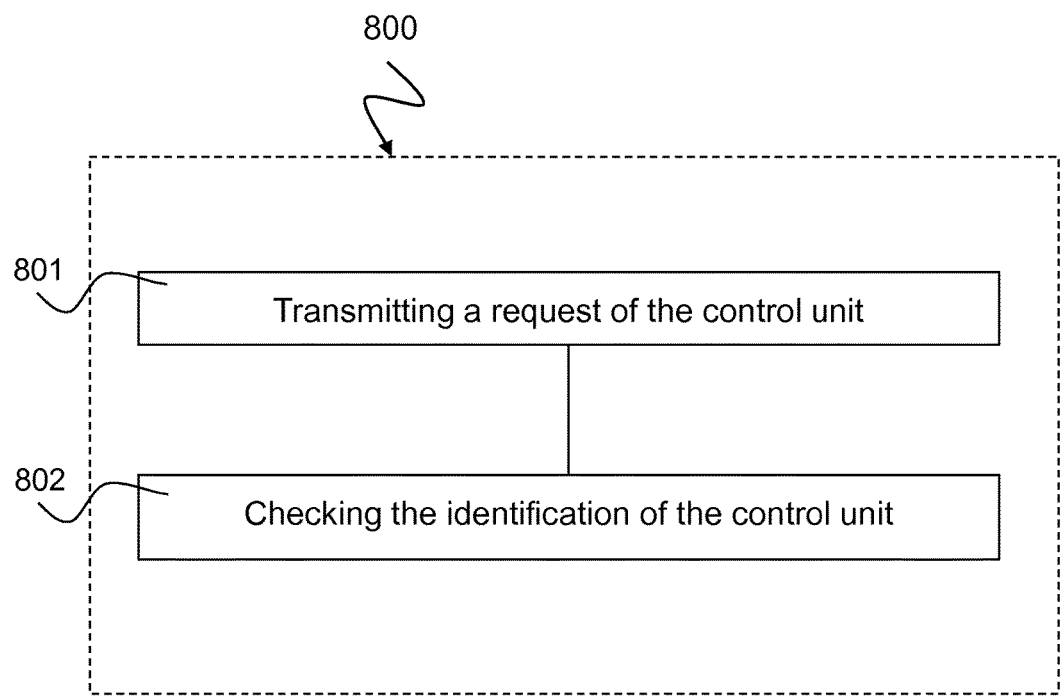
FIG. 8 is a schematic view of a method 800 for authenticating a control unit in a building-external authentication server according to one embodiment.

FIG. 8 is a schematic view of a method 800 for authenticating a control unit in a building-external authentication server according to one embodiment. The control unit 118 is used to control a building-internal electrical component, which is connected to a building-internal access portal 112, as described in FIGS. 2 to 7. The authentication takes place in a building-external authentication server 114 via a building-external communication network 113, as described in FIGS. 2 to 7.

The method 800 comprises the two shown steps of transmitting 801 and checking 802. The transmitting comprises transmitting 801 a request of the control unit 118 to the building-external authentication server 114 for an access authorization for the building-internal access portal 112 whilst quoting an identification of the control unit 118.

The checking comprises checking 802 by means of the building-external authentication server 114 whether, for the identification of the control unit 118, an allocation 611 to an access authorization for the building-internal access portal 112 is present in a memory of the building-external authentication server 114. The authentication is successful when the allocation 611 from the control unit 118 to the access authorization for the building-internal access portal 112 is present in the memory of the building-external authentication server 114.

One aspect of the invention also includes a computer program product which can be loaded directly into the internal memory of a digital computer and comprises software code portions by means of which the method 300, 600, 800 described in relation to FIG. 3, FIG. 6 or FIG. 8 can be carried out when the product runs on a computer. The computer program product can be saved on a computer-compatible medium and comprise the following: computer-readable program means, which prompt a computer to authenticate 501 the control unit against a building-external authentication server via a building-external communication network; transmit 502 a network address of the building-internal access portal by means of the building-external authentication server to the control unit in the case of a successful authentication of the control unit against the building-external authentication server via the building-external communication network; transmit 503 an access authorization for access to the building-internal access portal to the control unit by means of the building-external authentication server via the building-external communication network in the case of a successful authentication of the control unit against the building-external authentication server via the building-external communication network; and set up 504 the local control channel between the control unit and the building-internal access portal in response to receiving the network address of the building-internal access portal and the access authorization.

The computer program product can further comprise the following: computer-readable program means which prompt a computer to transmit 801 a request of the control unit to the building-external authentication server after an access authorization for the building-internal access portal whilst quoting an identification of the control unit; and to check 802 by means of the building-external authentication server whether, for the identification of the control unit, an allocation to an access authorization for the building-internal access portal is present in a memory of the building-external authentication server, wherein the authentication is successful when the allocation from the control unit to the access authorization for the building-internal access portal is present in the memory of the building-external authorization server.

The computer can be a PC, for example a PC of a computer network. The computer can be realized as a chip, an ASIC, a microprocessor or a signal processor and be arranged in a computer network, for example in a building-internal communication network or in a building-external communication network as described in FIG. 1 or 2.

It goes without saying that the features from the various embodiments described herein by way of example can be combined unless specifically stated otherwise. As shown in the description and the drawings, individual elements which have been shown in connection do not have to be directly connected to one another; intermediate elements can be provided between the connected elements. It also goes without saying that embodiments of the invention can be implemented in individual circuits, partially integrated circuits or fully integrated circuits or programming means. The term "for example" is merely meant as an example and not the best or optimal option. Particular embodiments have been illustrated and described herein, but it is clear to a person skilled in the art that several alternative and/or similar implementations can be carried out instead of the embodiments shown and described without deviating from the concept of the present invention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE NUMERALS

100: home automation network
101: communication channel between the control unit and the IAD
102: communication channel between the control unit and the central service
104: communication channel between the central service and the IAD
110: home or building-internal region
112: access portal or home-control gateway
114: authentication server or central service
115: boundary between the building-internal and the building-external region
116: IAD, internet access device
118: control unit
120: not home or building-external region
200: access system for a building-internal communication network
202a: connection end point or network address of the control unit
202b: connection end point or network address of the access portal
203: local communication channel between the control unit and the access portal
300: automation network
311: 1st sensor and/or actuator
312: 2nd sensor and/or actuator
313: 3rd sensor and/or actuator
321: 1st device network
322: 2nd device network
323: 3rd device network
400: access system for a building-internal communication network
500: method for setting up a local control channel between the control unit and the access portal
501: 1st method step: authenticating the control unit
502: 2nd method step: transmitting the network address of the access portal
503: 3rd method step: transmitting the access authorization for the access portal
504: 3rd method step: setting up the local control channel
600: method for controlling the communication between the building-external communication server 108 and a building-internal communication entity
610: 1st method step
611: creating the allocation
620: 2nd method step
621: recording the local address
622: recording the credential
630: 3rd method step
631: authenticating
632: requesting the address
633: requesting the credential
640: 4th method step
641: connecting to the address
642: authenticating with the credential
700: access portal
701: access information unit
702: communication interface
800: method for authenticating a control unit in an authentication server
801: transmitting request
802: checking identification

The invention claimed is:

1. A method for setting up a local control channel between a control device and a building-internal network device, the method comprising:
   authenticating the control device against a building-external authentication server via a building-external communication network;
   transmitting a network address of the building-internal network device using the building-external authentication server to the control device based on a successful authentication of the control device against the building-external authentication server via the building-external communication network;
   transmitting an access authorization for access to the building-internal network device to the control device using the building-external authentication server via the building-external communication network based on the successful authentication of the control device against the building-external authentication server via the building-external communication network; and
   setting up the local control channel between the control device and the building-internal network device in response to receiving the network address of the building-internal network device and the access authorization;
   wherein the control device controls sensors and/or actuators of an automation network via the building-internal network device, wherein the building-internal network device is connected to and controls access to the sensors and/or actuators of the automation network, and wherein the automation network comprises a plurality of device networks corresponding to a plurality of technologies and/or manufacturers, each device network comprising sensors and/or actuators corresponding to a specific technology or manufacturer;

wherein the building-internal network device communicates with a building-internal Internet access device via a building-internal communication network, and the building-internal Internet access device provides an interface between the building-internal communication network and the building-external communication network;

wherein authentication of the control device against the building-external authentication server and setting up the local control channel further comprise:

recording, by the building-external authentication server, an allocation from the control device to the building-internal network device, wherein the allocation indicates that the building-internal network device can be controlled by the control device, and wherein the building-external authentication server makes the allocation from a number of n control devices to a number of m building-internal network devices according to a n-to-m relationship;

recording, by the building-external authentication server, a local address, an identity, and credentials of the building-internal network device provided by the building-internal network device;

authenticating, by the building-external authentication server, the control device based on the recorded allocation;

returning, by the building-external authentication server, the recorded local address and credentials of the building-internal network device to the control device; and establishing a connection between the control device and the building-internal network device based on the returned local address of the building-internal network device and based on an authentication with the returned credentials of the building-internal network device.

2. The method of claim 1, wherein the sensors and/or actuators comprise a control element for heating, blinds, alarm systems, door locks, light switches, cookers, refrigerators, washing machines, coffee machines, or dishwashers.

3. The method of claim 1, wherein the sensors and/or actuators comprise a temperature sensor, a pressure sensor, a light sensor, or a light barrier.

4. The method of claim 1, wherein the network address and the access authorization are transmitted at the same time.

5. The method of claim 1, wherein the network address and the access authorization are transmitted one after the other.

6. The method of claim 1, wherein the control device controls the sensors and/or actuators of the automation network via the set-up local control channel.

7. The method of claim 1, wherein the control device controls the sensors and/or actuators of the automation network via the set-up local control channel by bypassing the building-external communication network.

8. The method of claim 1, wherein the network address of the building-internal network device is an IP address.

9. The method of claim 8, wherein the IP address is an IPv4 or IPv6 version.

10. The method of claim 1, wherein the network address of the building-internal network device is in an address space or subspace of the building-internal communication network.

11. The method of claim 1, further comprising:

transmitting the network address and the access authorization of the building-internal network device using the building-internal network device to the building-external authentication server; and saving an allocation between an identity of the building-internal network device and the transmitted network address and access authorization of the building-internal network device in a memory of the building-external authentication server.

12. The method of claim 1, wherein the building-internal network device is a gateway.

13. The method of claim 1, wherein the building-external communication network is the Internet.

14. The method of claim 1, wherein the authentication of the control device against the building-external authentication sever is carried out firstly via the building-internal communication network and subsequently via the building-external communication network.

15. A building-internal network device for at least one building-internal electrical component, which is connected to the building-internal network device, the building-internal network device comprising a processor and a non-transitory computer-readable medium having processor-executable instructions stored thereon, the processor being configured to execute the processor-executable instructions to facilitate:

recording a network address of the building-internal network device and an access authorization for the building-internal network device in an authentication server of a building-external communication network; and setting up, in response to a request of a control device to control the at least one building-internal electrical component, a local control channel to the control device when the request comprises the access authorization recorded in the authentication server, wherein the local control channel has connection end points at the building-internal network device and the control device, and wherein the local control channel is within a building-internal communication network;

wherein the processor-executable instructions, when executed, further facilitate:

communicating with a building-internal Internet access device via the building-internal communication network, wherein the building-internal Internet access device is configured to provide an interface between the building-internal communication network and the building-external communication network; and controlling access to sensors and/or actuators of an automation network, wherein the building-internal network device is connected to the sensors and/or actuators via the automation network, and wherein the automation network comprises a plurality of device networks corresponding to a plurality of technologies and/or manufacturers, each device network comprising sensors and/or actuators corresponding to a specific technology or manufacturer;

wherein the control device is authenticated against the building-external authentication server based on: an allocation from the control device to the building-internal network device recorded by the building-external authentication server, wherein the allocation indicates that the building-internal network device can be controlled by the control device, and wherein the building-external authentication server makes the allocation from a number of n control devices to a number of m building-internal network devices according to a n-to-m relationship; and wherein the set-up of the local control channel is further based on: a local address of the building-internal network device recorded by the building-external authentication server and returned by the building-external authentication server to the control device; and authentication of the control device based on credentials of the building-internal network device recorded by the building-external authentication server and returned by the building-external authentication server to the control device.

16. An access system for a building-internal communication network, the system comprising:
    a building-internal network device for at least one building-internal electrical component, which is connected to the building-internal network device;
    an authentication server, accessible via a building-external communication network; and
    a control device configured to control sensors and/or actuators of an automation network;
    wherein the building-internal network device is configured to record a network address of the building-internal network device and an access authorization for the building-internal network device in the authentication server;
    wherein the building-internal network device is configured, in response to a request of the control device, to set up a local control channel to the control device when the request includes the access authorization recorded in the authentication server;
    wherein the authentication server is configured, in response to a request of the control device for the network address of the building-internal network device and the access authorization for the building-internal network device while authenticating the control device in the authentication server, to transmit the requested network address and the requested access authorization to the control device based on a successful authentication of the control device and when an allocation is present between the control device and the building-internal network device in the authentication server;
    wherein the control device is configured, in the authentication server, to request the network address of the building-internal network device and the access authorization for the building-internal network device while authenticating the control device in the authentication server;
    wherein the control device is configured to set up a local control channel to the building-internal network device based on the network address of the building-internal network device which is transmitted by the server using the transmitted access authorization;
    wherein the local control channel has connection end points at the building-internal network device and the control device, and wherein the local control channel is within a building-internal communication network;
    wherein the building-internal network device is configured to communicate with a building-internal Internet access device via a building-internal communication network, and the building-internal Internet access device is configured to provide an interface between the building-internal communication network and the building-external communication network; and
    wherein the building-internal network device is connected to and is configured to control access to the sensors and/or actuators of the automation network, wherein the automation network comprises a plurality of device networks corresponding to a plurality of technologies and/or manufacturers, each device network comprising sensors and/or actuators corresponding to a specific technology or manufacturer;
    wherein the building-external authentication server is configured to record an allocation from the control device to the building-internal network device, wherein the allocation indicates that the building-internal network device can be controlled by the control device, and wherein the building-external authentication server makes the allocation from a number of n control devices to a number of m building-internal network devices according to a n-to-m relationship;
    wherein the building-external authentication server is configured to record a local address, an identity, and credentials of the building-internal network device provided by the building-internal network device;
    wherein the building-external authentication server is configured to authenticate the control device based on the recorded allocation;
    wherein the building-external authentication server is configured to return the recorded local address and credentials of the building-internal network device to the control device; and
    wherein setting up the local control channel is further based on the returned local address of the building-internal network device and based on an authentication with the returned credentials of the building-internal network device.

* * * * *